United States Patent [19]

Peirce, Jr. et al.

[11] Patent Number: 5,878,040
[45] Date of Patent: Mar. 2, 1999

[54] COORDINATION AND CONTROL OF DATA STREAMS THAT TERMINATE AT DIFFERENT TERMINATION UNITS

[75] Inventors: Kenneth L. Peirce, Jr., Wheeling; Daniel L. Schoo, Island Lake; Matthew H. Harper, Carol Stream, all of Ill.

[73] Assignee: 3Com Corporation, Santa Clara, Calif.

[21] Appl. No.: 918,817

[22] Filed: Aug. 26, 1997

Related U.S. Application Data

[63] Continuation of Ser. No. 560,314, Nov. 17, 1995, Pat. No. 5,717,690.

[51] Int. Cl.$^6$ .................................. H04J 3/12; H04J 3/24
[52] U.S. Cl. .......................... 370/389; 370/420; 370/474
[58] Field of Search ..................................... 370/352, 389, 370/392, 395, 397, 401, 402, 410, 420, 421, 473, 474, 522, 524, 902, 904, 470, 471; 379/93.05, 93.06, 93.07

[56] References Cited

U.S. PATENT DOCUMENTS

| 4,996,685 | 2/1991 | Farese et al. | 370/524 |
|---|---|---|---|
| 5,208,811 | 5/1993 | Kashio et al. | 370/401 |
| 5,268,904 | 12/1993 | Umeda | 370/421 |
| 5,347,516 | 9/1994 | Yoshida | 370/401 |
| 5,357,504 | 10/1994 | Siegmund | 370/469 |
| 5,519,704 | 5/1996 | Farinacci et al. | 370/401 |
| 5,528,595 | 6/1996 | Walsh et al. | 370/403 |
| 5,577,105 | 11/1996 | Baum et al. | 379/93.05 |

OTHER PUBLICATIONS

RFC 1661 The Point–to–Point Protocol, W. Simpson, ed., (Jul. 1994).
RFC 1717 The PPP Multilink Protocol (MP), K. Sklower, B. Lloyd, G. McGregor, D. Carr, (Nov. 1994).
G. Conant, "Multilink PPP: One Big Virtual Wan Pipe." *Data Communications Magazine*, pp. 85–90, (Sep. 21, 1995).

*Primary Examiner*—Alpus H. Hsu
*Attorney, Agent, or Firm*—McDonnell Boehnen Hulbert & Berghoff

[57] ABSTRACT

A method for coordinating and controlling multiple data streams representing a data transmission session that terminate in different termination units (such as network access servers). The data streams are transmitted over two or more links, collectively forming a "bundle". The termination units are linked together preferably over a local area network. One of the termination units that receives a data stream is designated as the termination unit to receive and reconstruct the call. The designated termination unit is the "owner" of the bundle. The termination unit broadcasts an advertisement consisting of a bundle mapping update packet software structure with an identification header to alert the other termination units that it is to reconstruct the call. The identification header in the advertisement notifies the other termination units that if they should receive a portion of the data stream in the bundle, they should forward their packets of data to the designated termination unit. The sharing of bundle information between the termination units gives a great deal of flexibility in the design and type of termination units that may be employed.

5 Claims, 6 Drawing Sheets

FIG. 5B

NUP => This field contains an unsigned long value indicating the number of updates in the packet UT => This field contains the type of update. The valid values for this field are:
- 0x01 - New Bundle - packet carries bundle id info.
- 0x02 - Sustained Bundle (reset aging timer)
- 0x03 - Dropped Bundle - Bundle dropped, delete redirected links.
- 0x04 - New Link - New link for bundle - copied from redirection table.
- 0x05 - Dropped Link - remove entry from redirection table.

FIG. 7

```
struct redirection_entry {
        sturct redirection_entry*next;
        unsl     mpip_valid;
        unsl     mpip_age;
        unsl     mp_endpoint_type;/*bundle id type*/
        unsl     mp_id_endpoint[20];/*holds actual endpoint */
        unss     mp_mrru;/* */
        unsb     phys_addres[6]; /* cache MAC address */
        unsb     mp_bundle_owner
} RDE;
```

COORDINATION AND CONTROL OF DATA STREAMS THAT TERMINATE AT DIFFERENT TERMINATION UNITS

This is a continuation of application Ser. No. 08/560,314 filed Nov. 17, 1995, now U.S. Pat. No. 5,717,690.

BACKGROUND OF THE INVENTION

A. Field of the Invention

This invention relates generally to the field of telecommunication and the processes by which digital data is transmitted between computer systems over a telephone network or other communications link. The invention is particularly suitable for use in devices that support Integrated Services Digital Network (ISDN) digital telephone services or other serial communications.

B. Description of Related Art

The Point-to-Point Protocol (PPP) provides a standard method of encapsulating network layer protocol information over point-to-point links. The PPP also defines an extensible Link Control Protocol (LCP), and proposes a family of Network Control Protocols (NCPs) for establishing and configuring different network-layer protocols. The PPP is described in detail in a series of documents known as the Request For Comments, with which those of skill in the art are familiar. The Request For Comments (RFC) 1661, which is incorporated by reference herein, gives an informative overview of the PPP.

The initial deployment of the PPP has been over short local lines, leased lines, and plain-old-telephone-service (POTS) using modems. As new packet services and higher speed lines are introduced, PPP is easily deployed in these environments as well.

The PPP has three main components:

1. A procedure for encapsulating datagrams over serial links;
2. A Link Control Protocol (LCP) for establishing, configuring, and testing the data-link connection; and
3. A family of Network Control Protocols (NCPs) for establishing and configuring different network-layer protocols.

In order to establish communications over a point-to-point link, each end of the PPP link must first send LCP packets to configure the data link during the Link Establishment phase. After the link has been established, PPP provides for an optional Authentication phase before proceeding to the Network-Layer Protocol phase.

PPP encapsulation of data communications is possible when the data is transmitted over digital communication lines, such as ISDN lines. ISDN Basic Rate Service comprises two data channels (referred to as bearer channels or "B" channels), and a control channel known as the "D" channel. The ISDN D-channel can also be used for sending PPP packets when suitably framed, but is limited in bandwidth and often restricts communication links to a local switch. Since the ISDN B-channel is by definition a point-to-point link, PPP is well suited to use over ISDN lines.

The ISDN Primary Rate Interface may support many concurrent B-channel links. The PPP Link Control Protocol and Network Control Protocol mechanisms are particularly useful in this situation in reducing or eliminating hand configuration, and facilitating ease of communication between diverse implementations.

In order to accommodate ISDN data links over multiple channels simultaneously, a protocol known as PPP Multi-Link or MP is used. The PPP MultiLink protocol is described in the Request For Comments 1717, which is incorporated by reference herein. A good discussion of the advantages of PPP Multilink can be found in an article authored by George E. Conant, entitled "Multilink PPP: One Big Virtual WAN Pipe", Data Communications, Sep. 21, 1995. In MP, the data stream, which consists of packets, is split up and inverse-multiplexed onto multiple channels (such as the two ISDN B channels), transmitted through the ISDN network, and then directed to the destination over multiple channels. The term "bundle", as used herein, is intended to mean a collection of links or logical connections that the are used for the communication session. In ISDN basic rate service, and where the two bearer channels are used for the session, the two bearer channels comprise a "bundle." At the destination, the data packet stream arriving in separate channels must be reconstituted or reconstructed after transiting the communication channels.

The above circumstance presents a challenge to the design of equipment for running PPP Multilink on a Primary Rate Interface server at the destination, since the server or termination point is interfacing with a large number of channels of incoming calls, two of which may together comprise a bundle. Heretofore, one approach as been that of fixed mapping, i.e., restricting all calls to a single server or gateway card. An alternative approach is time division multiplexing, but this approach has limited flexibility.

The present invention provides for a much more flexible solution. As described below, bundling information is shared between all of the termination units that receive the calls at the Primary Rate Interface. The present invention provides a method for controlling and coordinating bundles of data streams among multiple termination units, and the reconstitution of the session data at a designated termination unit for transmission of the call to the intended destination.

While the discussion below is primarily directed to an ISDN application, those of skill in the art will appreciate that the invention is applicable to any communication system in which a session arrives via multiple links at different termination units.

SUMMARY OF THE INVENTION

A method is provided for coordinating and controlling multiple data streams representing a session that terminates in different termination units (such as network access servers). The termination units are placed in communication with each other preferably over a local area network. One of the termination units that receives a data stream representing a call is designated as the termination unit to receive and reconstruct the call. The designated termination unit is the "owner" of the bundle. The designated termination unit may be the first termination unit to receive a call in the session, or it may be determined by an operator at the destination or host for the termination units. The designated termination unit broadcasts an "advertisement" consisting of a software structure referred to herein as a "bundle mapping update packet." The bundle mapping update packet contains an identification field to alert the other termination units that it has received the call. The identification field notifies the other termination units that if they should receive a portion of the data stream via a channel that belongs in the call originator's "bundle", representing the session, they should forward their packets of data to the designated termination unit, such as by encapsulating the packets within an MPIP redirection header.

When the other termination units receive the advertisement, they update their bundle maps and determine if any new data packet streams that arrive are designated for redirection. If so, they (1) determine from the bundle map which termination unit to send the packet stream to, (2) send an update message to the designated termination unit to let it know that it has another portion of the session, and (3) flush their buffers containing the data stream to the designated termination unit. The sharing of bundle information between the termination units gives a great deal of flexibility in the design and type of termination units that may be employed.

While the invention in its simplest form is the coordination of two termination units to handle a session over two channels, the session may take place over an arbitrary number of channels. The sharing of bundle information between a large number of termination units permits the invention to be used in much larger and more sophisticated systems. The flexibility of the present invention is believed to offer a substantial improvement over prior art method of implementing PPP Multilink in a multiple termination unit environment.

BRIEF DESCRIPTION OF THE DRAWINGS

Presently preferred embodiments of the invention are depicted in the drawings, wherein like reference numerals refer to like elements in the various views, and wherein:

FIG. 7 is a software structure that embodies a list element. A bundle mapping table (or Link Redirection Table) is a circularly linked list comprised of the software structure of FIG. 7.

DETAILED DESCRIPTION OF THE PREFERRED EMBODIMENT

A. System Overview

Figure 1:
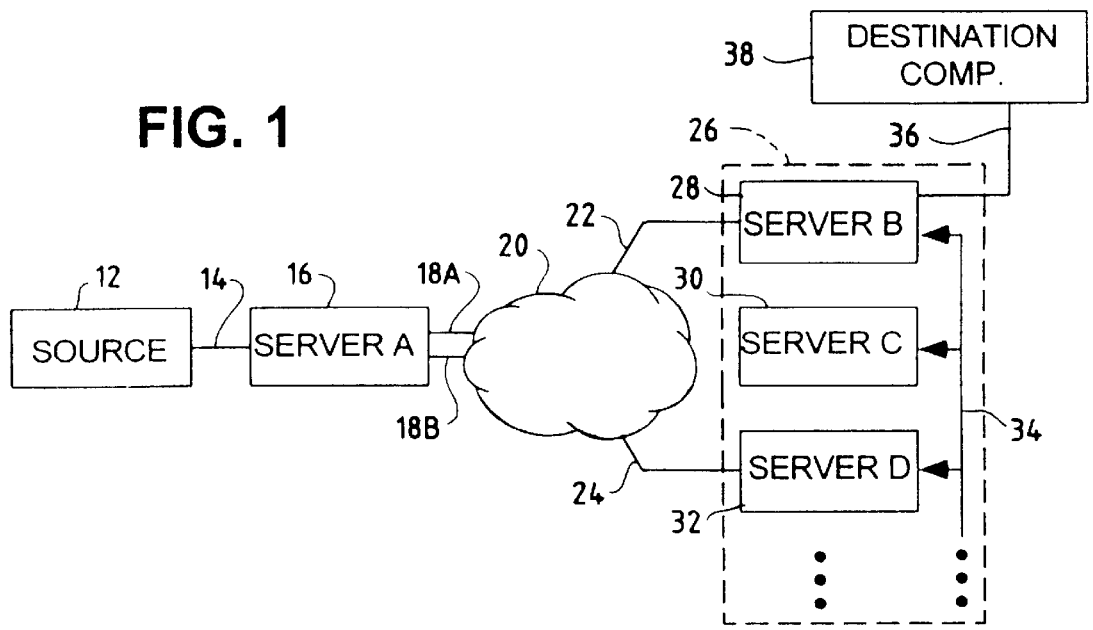
FIG. 1 is a overall block diagram of a system implementing a preferred embodiment of the invention.

Referring to FIG. 1, a representative implementation of the invention is shown diagrammatically in a communication system 10. While the following discussion is based on an ISDN implementation, it will be appreciated that the techniques are applicable to other types of communication systems (such as T-1) and other WAN topologies. The system 10 includes a source of data 12 that is linked to a client server A (reference numeral 16) via a network or communication line 14. The client server A may be, for example, an ISDN terminal adapter, or an internal PC card in the source 12. The server A has an ISDN basic rate interface providing two bearer channels 18A and 18B for data. The channels 18A and 18 are linked to an ISDN network 20. In the embodiment of FIG. 1, the client server 16 supports PPP Multilink protocol. Thus, when the client server A places a call to a destination 26, the data is split over the two bearer channels 18A and 18B and transmitted through the network 20 to a destination call receiving system 26. In this embodiment, an ISDN Primary Rate Interface with PPP Multilink is supported by the destination 26, thus the call may come in on two of the channels 22 and 24 that are part of the ISDN Primary Rate Interface.

In the representative embodiment of FIG. 1, the destination 26 is composed of a plurality of termination units for incoming calls, such as a group of network access servers 28, 30 and 32. Any number of additional termination units may be provided. The network access servers 28, 30 and 32 contain communications interface cards to receive incoming packets of data from the lines 22 and 24, and gateway cards containing suitable hardware and software systems to place the calls on a network 36 for transmission to a destination computer 38, for example, over a network. Persons of skill in the art are familiar with network access servers, and such products are available from companies such as U.S. Robotics Access Corp., 8100 N. McCormick Blvd., Skokie, Ill., the assignee of the present invention. Such network access serves are also described in the patent literature, see, e.g., U.S. Pat. No. 5,528,595 to Dale Walsh et al., also assigned to the assignee of the present invention, which is incorporated by reference herein.

As noted above, the data stream representing the call from the source 12 is split up into two data streams that are received at the remote termination units 28 and 32. In accordance with the invention, the termination units 28, 30, 32, etc. are all in communication with each other, such as by a local area network 34. The local area network 34 may be a backplane linking the network access servers 28, 30 and 32 together over a high speed time division multiplexed bus, a Token Ring network, an Ethernet network, or any other suitable communications medium. The termination units are linked together so as to share bundling information between the termination units that happen to receive the data stream on the lines 22 and 24.

More specifically, when the call from the source is split up in lines 18A and 18B in accordance with PPP Multilink, the data streams will arrive at the destination 26 in lines 22 and 24 at different points in time. According to a preferred embodiment of the invention, the first termination unit to receive the call, such as termination unit or network access server B, is designated as a receiving termination unit. It has the responsibility of reassembling the data stream and forwarding the data on to the remote computer 38. When it receives the call, the termination unit B broadcasts or "advertises" via the local area network 34 that it (unit B) is the designated termination unit. The broadcast is made to the other termination units in the destination 26, such as unit D. If any of the other termination units receive calls from the source 12 or client server A (such as unit D) that belong in the bundle comprising the session, they should transmit the data to the designated termination unit B. The designation of a termination unit as a termination unit for reconstituting the data stream may be made locally at the destination by a suitable control or operator program, rather than simply being the consequence of being the first termination unit to receive a call in the bundle.

This advertising or broadcasting is done by passing a software structure referred to herein as a "bundle mapping update packet" along the local area network 34. The bundle mapping update packet contains a header field that identifies the particular termination unit that is designated to reconstruct the call.

In the above example, the other termination units (such as units C, D, etc.) are also receiving calls from the other channels in the PRI, and when one of them receives a data stream that is part of the session from the source 12, the other termination unit knows to send its data stream to the receiving termination unit designated as the bundle owner because it will have received a bundle mapping update packet indicating the termination unit that it is the bundle owner. For example, if termination unit D also receives a data packet stream from the source, unit D will have received the broadcast message (i.e., bundle mapping update packet) from unit B alerting it that unit B is the designated termination unit. As the bundle mapping update packet makes its way around the local area network 34, 34, it updates a bundle map software structure resident in the termination units B, C and D, thus keeping all of the termination units up-to-date as to what calls are coming in on the PRI. Preferably, the bundle mapping update packets are circulated frequently around the termination units at the destination 26, such as every 60 to 120 seconds.

Of course, the invention can be implemented in a wide variety of network topologies, and the number and type of termination units will vary depending on the complexity of the system. Gateway cards and network access servers are just two representative examples of what is meant by "termination units". The ability to combine different types of termination units to receive the incoming calls in multiple communication channels gives an enormous amount of flexibility to the system 10, promoting an efficient utilization of PPP Multilink technology.

Figure 2:
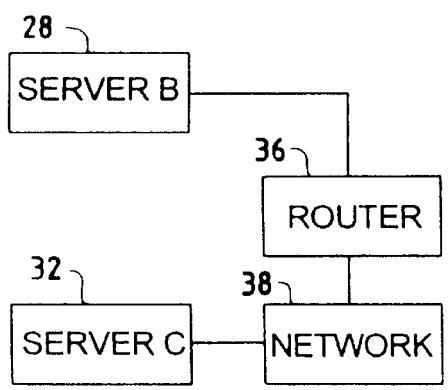
FIG. 2 is block diagram of an alternative embodiment of the invention, showing the linking of two termination units of FIG. 1 via a router and a network.

Referring to FIG. 2, the two termination units 28 and 32 that receive the data packet streams may be linked via a router 36 and a network 38, with the bundling information being shared between the termination units 28 and 32 via the router 36 and network 38.

Figure 3:
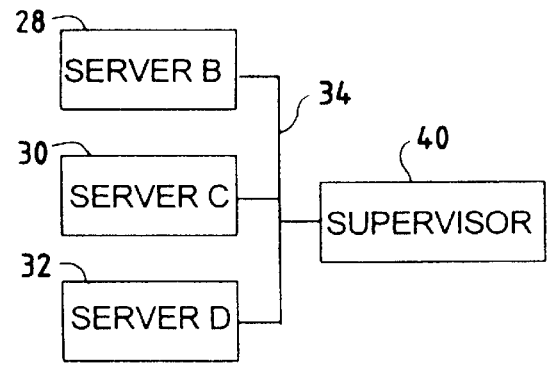
FIG. 3 is a diagram of an alternative embodiment of the invention, wherein a supervisor S exercises control over the broadcasting of bundle mapping update packets and controls the reconstruction of the data stream.

As an alternative configuration, FIG. 3 illustrates how the termination units 28, 30 and 32 may be linked to each other by a network 34, with a supervisor server or computer 40 also on the network 34. The supervisor 40 monitors the sharing of bundling information among the termination units 28, 30 and 32 and directs the processing of the incoming calls among the termination units.

The embodiments of FIGS. 1–3 illustrate only a few of many possible combinations of termination units, routers, servers, local area networks, in which the invention may be implemented. Persons of skill in the art will readily appreciate that more elaborate arrangements may be designed without departure from the spirit of the invention.

Referring to FIG. 1, the latency (i.e., delay) in routing of the portion of the call received by termination unit D to receiving termination unit B is an important factor in implementing the invention. The latency should be reduced as much as possible. Having the termination units B, C and D, etc. on a local area network, ATM (Asynchrounous Transfer Mode) network or backplane is a preferred embodiment, as this design produces a minimum of latency. The use of a supervisory controller such as supervisor 40 (FIG. 3), or routers, may increase latency and diminish performance of the system.

B. Sharing of Bundling Information

A protocol has been developed for implementing the invention in a PPP Multilink environment. We have termed this protocol the Multilink Protocol Interspan Protocol (MPIP).

Figure 4:
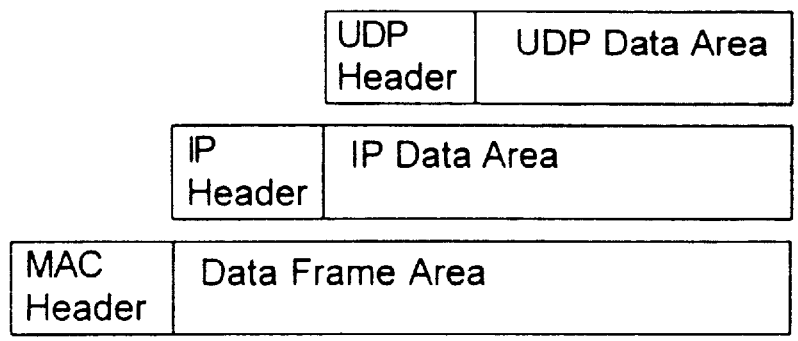
FIG. 4 is a diagram of a protocol structure for implementing the invention in a PPP Multilink environment.
Figure 6:
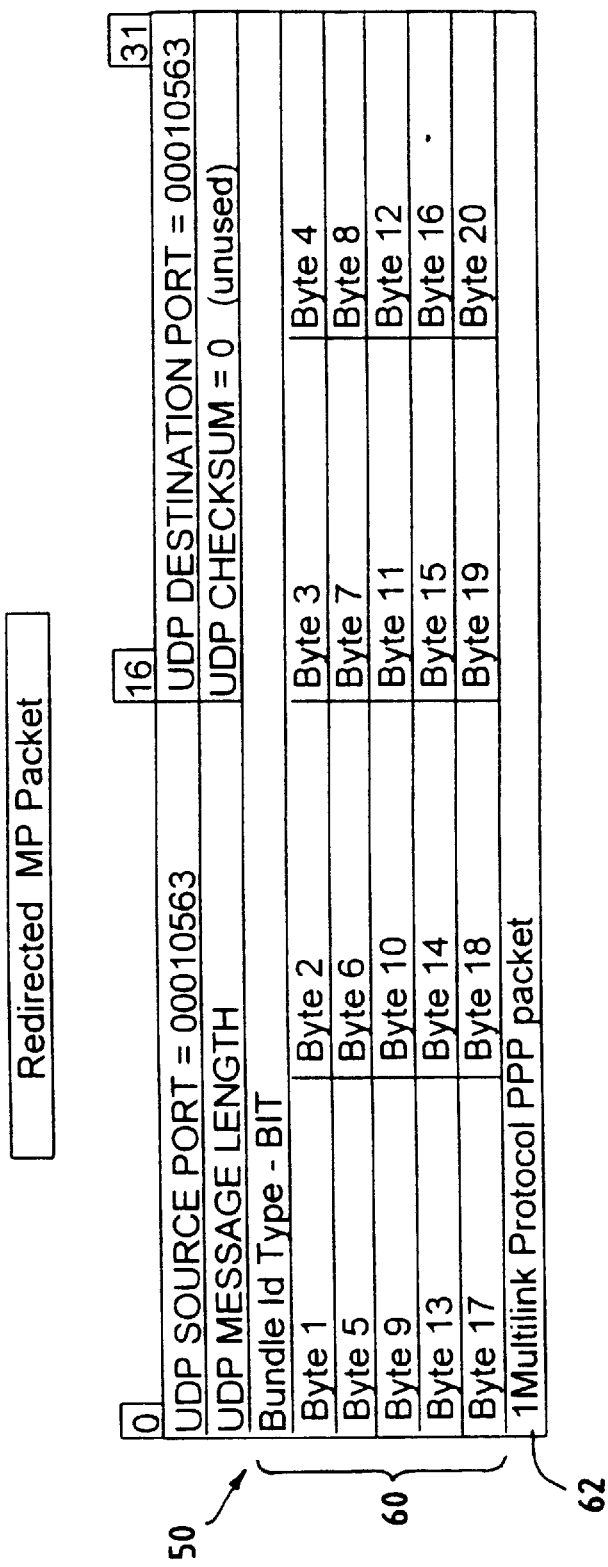
FIG. 6 is an illustration of an MPIP packet according to the invention, the MPIP packet containing a multilink frame of data from the source for transmission to the designated termination unit.

FIG. 4 is a diagram of a protocol structure for implementing the invention in a PPP Multilink environment. A MAC (Medium Access Control) header and Data Frame Area are at the lowest level. Above the lowest level there is an IP (Internet Protocol) header and an IP Data Area. At the top there is a UDP (Unnumbered Data Packet) header and a UDP Data Area. MPIP packets are used to carry bundle identification headers and 1 Multilink Protocol PPP payload packet. An MPIP packet 50 is shown in FIG. 6. Note the header fields 60 and the Multilink protocol PPP packet 62 form the bulk of the MPIP packet. The Multilink Protocol PPP packet 62 in the MPIP packet 50 contains the data that is transmitted from one termination unit in the destination to the designated receiving termination unit.

Figure 5:
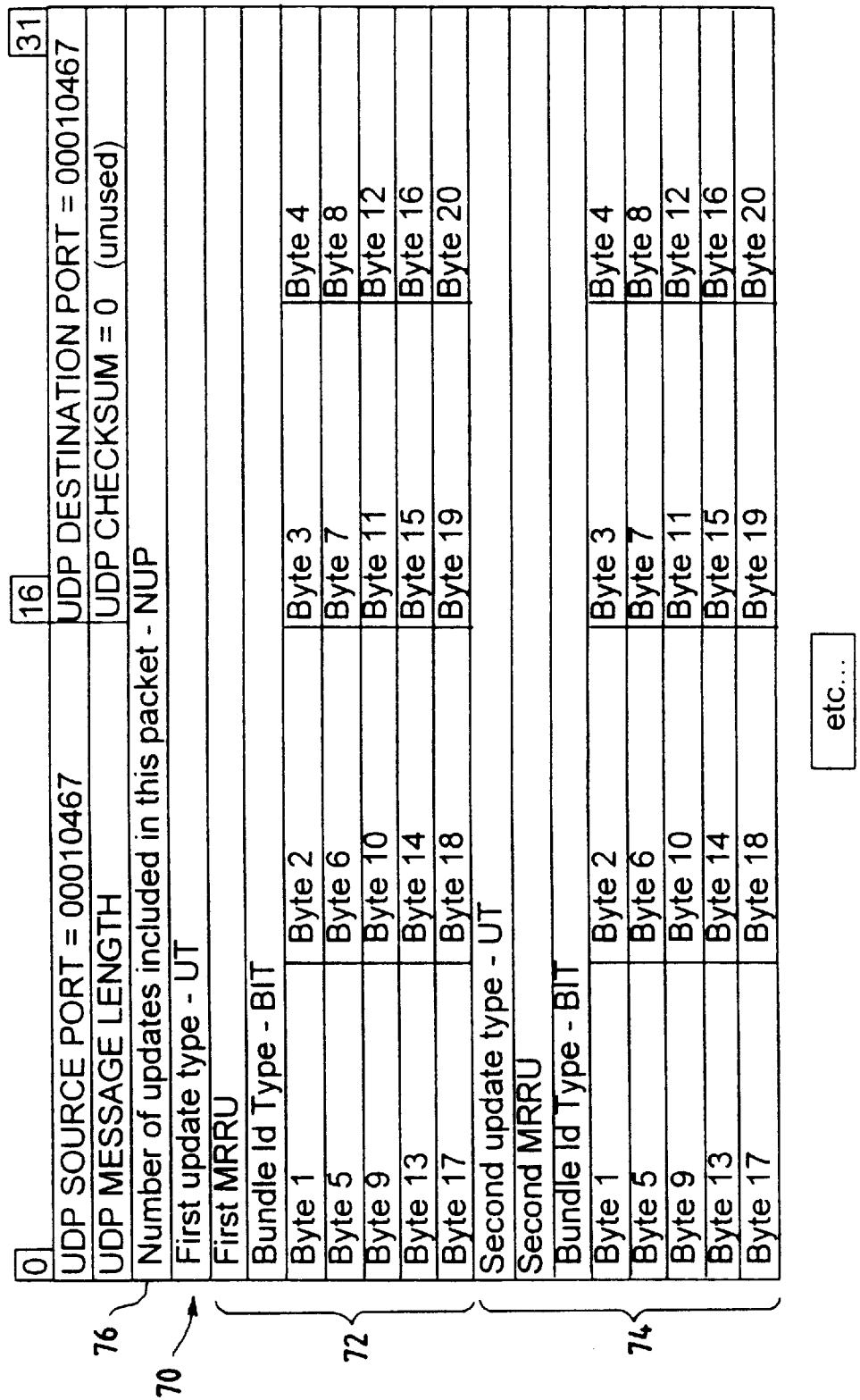
FIG. 5A and 5B are is an illustration of a bundle mapping updating packet according to a preferred embodiment of the invention, the bundle mapping update packet containing a field identifying the designated termination unit to reconstruct the call at the destination.

The UDP IP packets are used to carry the bundle mapping update packets and MP frames. A bundle mapping update packet 70 is shown in FIG. 5 and is used to update the bundle maps in the termination units. The bundle mapping update packet 70 has an arbitrary number of bundle map update fields 72, 74, etc. The NUP field 76 identifies the number of update fields 72, 74 there are in the packet 70.

The list of entries shown in FIG. 7 are used to hold bundle information from the other termination units at the destination. These list of entries are linked together and circulated around the termination units as a linked list. Entries are created dynamically as there is no way to predict the number of termination units on the local area network 34.

The following rules govern the behavior of a chassis on the local area network 34 for this protocol.

1. Information will be sent out concerning only those bundles that are possessed by the termination units.
2. All the "owned" table (or bundle map) entries will be sent out every 60 seconds over the local area network 34.
3. The IP packet will have a broadcast destination IP and MAC addresses and a time to live of 1.
4. Entries in the table with age out in 120 seconds if not updated via periodic updates from the bundle mapping update packet.
5. When a termination unit receives a bundle advertisement from another termination unit, if it also holds a bundle with the same identification (indicating that the call came over the two data channels from the source 12 at the same time), the two will compare tie breaker values, and the one with the higher value will assume ownership of the bundle. The tie breaker values can be arbitrarily assigned, such as the physical address of the termination unit's network interface card (not shown) or some other criteria, the details of which are not important.

If the termination unit holds the lower value (it lost the tie-breaker) it adds an entry into the map for the now foreign bundle, marks the mp_bundle_owner field FALSE, indicating that it is not the bundle owner and, hence, is is not responsible for reconstitution of the the packet stream. The termination unit sends a new update message to the owner of the bundle identifying its stream and then flushes its buffers to the bundle owner, thereby routing the portion of the call received by the termination unit to the bundle owner. mp_bundle_ owner is an entry in the list data structure of FIG. 7.

If the termination unit holds a higher value because it was assigned a higher value in the tie breaker, or was assigned a higher value by an operator program at the destination, it immediately sends an advertisement to the peers. Specifically, it sends out a new bundle mapping update packet over the local area network 34 to the other termination units identifying and noting its ownership of the bundle.

The following PPP routines will be modified to implement the MPIP protocol. n__input( )

This function's first test will be to check for an MPIP UDP packet. This test must be done extremely fast to prevent slowing down other IP traffic.

1. Test the IP protocol field looking for IPPROTO__UDP.
2. If TRUE check for MPIP destination socket
3. If MPIP__DATA__SOCK then call asynch PPP input routine with port determined by bundle lookup. Search algorithm will key off of bundle id type and then first word or id to speed search.
4. if MPIP__CONTROL__SOCK then call mpip__in( ).

MPIP Specific Routines
mpip__in( )

This function takes an MPIP__CONTROL__SOCK packet and processes it according to the type of packet. switch (type)

1. New Bundle—Check Link Redirection Table (the "LRT" otherwise know as as the bundle map) for match.
   2. If the host termination unit (such as an ISDN gateway card or ISDN-GWC) owns the bundle, compare LAN MAC addresses.
      If host wins send out MPIP control packet with New Bundle type.
      If host loses send out MPIP control packet with New Link type.
   2. If host doesn't find entry in LRT, make a new entry and mark as redirected.
2. Sustained Bundle—Check LRT for matching entry.
   If found reset aging timer
   If not found create a new entry marked as redirected
   If found that host owns bundle, treat as New Bundle type
3. Dropped bundle—check LRT for match
   If not found discard info.
   If found and sender is owner of record, delete entry else discard.
4. New Link—check LRT for match
   If found and host owns bundle, delete redirect link.
   If not found ignore default: discard info mpip__send(type, mp__bundle-struct *ptr)

This function will be responsible for the sending out of all types and sizes of packets. This keeps maintenance to a minimum.

type=MPIP__COMPLETE(full LRT advertisement), ptr= NULL

1. If no entries in table exit
2. Get memory buffer to hold message
3. Build MPIP header with empty entries count in message buffer
4. march down table, creating one appropriate entry in the packet for each entry in the LRT.

type=MPIP__FLASH(response to bundle ownership claims), ptr=target entry 1. get memory buffer to hold message
2. Build MPIP header with entries count equal to 1 in message buffer
3. create one entry in the packet for the entry in the LRT.
4. call network send routine mpip__timer( )
This function runs every 5 seconds.
1. Add 5 seconds to the complete update timer.
2. Is it time to run complete update?
   Yes call mpip send with MPIP__COMPLETE code to cause all owned bundles to be advertised (invalid bundles are always advertised).
3. Run down the LRT and increase the age by 5 seconds for each entry. When an entry is 120 seconds old, it is marked as FALSE (invalid).
4. If an entry is 10 seconds past the time when it was marked invalid, delete it. This permits an aged out entry to be advertised 3 times as dead. This will ensure a faster end to orphaned redirected links than would normally occur with an aging-out.

It will be appreciated from the forgoing description of a presently preferred embodiment of the invention that some variation in the above procedure is envisioned depending on the particular features of the data transmission medium, the capabilities of the termination units and the network linking the termination units. Such variations will apparent to those of skill in the art and are intended to be within the spirit and scope of the invention. This true spirit and scope is defined by the appended claims, to be interpreted in light of the foregoing specification.

We claim:

1. A method for coordinating the reconstruction of a plurality of data streams including a first data stream and a second data stream, said first and second data streams representing a session generated by a source and transmitted over a plurality of links collectively forming a bundle, said first data stream terminating in a first termination unit and said second data stream terminating in a second termination unit, said first and second termination units linked to each other over a communications medium, comprising the steps of:

generating packets containing bundle information in said first and second termination units, said packets containing information as to the receipt of said first and second data streams by said first and second termination units, respectively;

placing said packets on said communications medium;

receiving said packets containing bundle information at a supervisory server connected to said communications medium, said supervisory server identifying one of said first and second termination units as a designated termination to receive and reconstruct said first and second data streams from said bundle information; and said supervisory server directing the assembly of said first and second data streams at said designated termination unit, whereby said designated termination unit receives said data stream from the other of said first and second termination units and reconstructs said data streams for transmission to a destination.

2. The method of claim 1, wherein said communications medium comprises a local area network.

3. The method of claim 1, wherein said first and second termination units comprises network access servers.

4. The method of claim 1, wherein said supervisory server determines one of said termination units as said designated termination unit based on the order in which said first and second data streams are received by said first and second termination units.

5. The method of claim 1, wherein said supervisory server determines one of said termination units as said designated termination unit based on an operator program run at said supervisory server.

* * * * *